United States Patent Office 2,831,809
Patented Apr. 22, 1958

2,831,809
ONIUM CLAY GREASE CONTAINING SURFACE ACTIVE AGENT

Walter H. Peterson, Point Richmond, Calif., assignor to Shell Development Company, Emeryville, Calif., a corporation of Delaware No Drawing. Application November 25, 1952
Serial No. 322,583

3 Claims. (Cl. 252—25)

This invention is directed to grease compositions. More particularly, it is concerned with oils thickened to a grease-like consistency by the presence of organophilic clay products having improved lubricating characteristics.

Greases useful as bearing lubricants and the like have been made for many years by using high molecular weight soaps as gelling agents in lubricating oils. Such greases inherently possess the shortcoming of excessive softening and even fluidizing when subjected to elevated temperatures due apparently to changes in the crystal structure of the soaps. More recently, greases have been prepared by incorporation of highly porous amorphous inorganic colloids such as silica and the like which are an improvement upon greases gelled with soaps, particularly with respect to their substantially uniform consistency over a wide temperature range. Such greases are, however, sensitive to the presence of water and disintegrate upon contact therewith unless protected by the presence of hydrophobic surfactants, such as those disclosed in U. S. Patent 2,554,222 to Fred H. Stross.

A still newer form of grease comprises lubricants thickened to a grease consistency by the presence of oleophilic clays which comprise cationic exchange products formed by the high base exchange clays and onium compounds such as quaternary ammonium salts and the like. The onium clays are substantially the equivalent of porous silica whose surface has been protected by a monomolecular layer of a cationic hydrophobic surface active agent. This is true, however, only insofar as resistance to disintegration by the presence of water is concerned. It has been determined in recent investigations that greases gelled with onium clays such as the onium reaction products of Wyoming bentonite and the like exhibit extremely poor lubrication characteristics and in fact cause bearing seizure to occur within a very short time in the presence of water.

In addition to the broad concept of protection against disintegration by the presence of water an improved type of cationic surface active agent having exceptional beneficial protective properties is described in U. S. Patent No. 2,623,852 by Walter H. Peterson of which the present application is a continuation-in-part. This parent application describes the use of condensation products of such materials as epichlorohydrin with ammonia and the formation of partial amides therefrom to prepare the outstanding class of water-proofing agents claimed in the specification. In the parent application the generic concept was the utilization of such condensation products as the sole water-proofing surfactant present in greases gelled with amorphous colloids or the use of such reaction products in the preparation of onium clays.

It is an object of the present invention to provide improved grease compositions. It is a second object of this invention to provide onium clay greases having enhanced lubricating properties. It is a further object of this invention to provide onium clay greases exhibiting improved lubrication and corrosion properties. Other objects will become apparent during the following discussion.

Now in accordance with the present invention it has been found that the lack of proper lubricating properties of greases gelled with organophilic clays can be corrected to a substantial extent by the presence in the grease either in the form of an adsorbed surface film or in dispersion throughout the lubricating oil phase of an at least partially oleophilic polyamino oxy compound containing at least three nitrogen atoms and oxy groups together, i. e., at least two nitrogen atoms and an oxygen atom or at least one nitrogen atom and two oxygen atoms. Still in accordance with this invention further improvements especially with respect to corrosion may be obtained by the additional presence of either an inorganic nitrite or of an alkaline acting compound of an alkali earth metal. In further accordance with this invention an unexpectedly great improvement in both lubrication properties, water-resistance and in corrosion characteristics is obtained by the combined use of both the nitrite and alkali earth metal compound in conjunction with the polyamino oxy compound as improving agents for onium clay greases.

The present invention therefore constitutes the improvement in the lubricating properties of onium clay greases caused by incorporation of the subject oleophilic polyamino oxy compounds to largely correct the poor lubricating characteristics of ordinary onium clay greases. While the lubrication properties are thus improved, the grease compositions still cause a certain amount of corrosion when utilized in the presence of water. This can be overcome to a substantial extent by the addition of an inorganic nitrite such as sodium nitrite or an alkaline earth metal compound such as lime, as more particularly described hereinafter.

The essential ingredients in the grease compositions of the present invention comprise a lubricating oil, an onium clay and an at least partly oleophilic polyamino compound containing at least three nitrogen atoms and oxy groups together. The latter class of materials is fully described in the parent application referred to hereinbefore. In a preferred class of the agents two of one and one of the other of amino and hydroxy groups are attached to different but proximate carbon atoms such that no two of them are separated by more than ten carbon atoms. By the term "amino nitrogen atom," "amino group," and others of similar import, is meant a nitrogen atom directly attached to a carbon atom, regardless of whether the nitrogen atom is also attached to hydrogen atoms, other carbon atoms and/or to some other atom or atoms, and also regardless of what other atom or atoms may be attached to the nitrogen bonded carbon atom. Thus the terms are meant to include alkylene amino compounds and also acyl amino compounds (amides), as well as alkyl acyl amino compounds. By the term "oxy" is meant hydroxy and alkoxy. Thus the agents are at least partially oleophilic polyamino alcohols or polyhydroxy amines and corresponding ethers including and preferably for the practice of the invention, polymers of the simple low molecular weight materials.

Polyamino alcohols and polyhydroxy amines which come within the foregoing definition also include nitrogen-reaction products of the monomers or polymers thereof and their mixtures. A particularly preferred class of said agents is the class of organic acid-reaction products of said substances and their polymers, particularly, their amides which may then be formed from the amino (primary or secondary) alkanols or dihydroxy alkyl amines (primary or secondary), by amidation (preferably only partially) of the amino group thereof by the reaction with a fatty acid containing from about twelve carbon atoms to about twenty-four carbon atoms, and corresponding amides of polymers (particularly dimers and trimers and mixtures thereof) of monomeric substances.

The preparation of the improving agents of this invention is exemplified by the condensation of ammonia or primary or secondary amines with a suitable polyfunctional halohydrin, such as monohalodihydroxy-compounds, including their epoxy derivatives, such as epihalohydrins, and dihalo-monohydroxy-compounds. The simplest polyamino hydroxy reaction products thus obtainable, and preferably polymeric products thereof, are reacted with highly oleophilic organic compounds reactive therewith, particularly with the amino groups, such as various organic acylating compounds, and particularly the fatty acids. The amino reactant which is condensed with the halohydrin preferably is ammonia or an amine which contains a hydrocarbyl (preferably aliphatic) radical(s) or other organic substituent radical having not more than twenty carbon atoms per radical, preferably less than ten. These include the primary aliphatic amines such as methylamine, ethylamine, up to dodecylamine, the secondary aliphatic amines such as dimethylamine, methyl ethylamine, dipropylamine, dihexylamine, and the like, the polyamines such as ethylene diamine, propylene diamine, tetraethylene pentamine, and the like, as well as the amines which contain various substituent polar groups. In general, the amino reactant should have a molecular weight which is not greater than about 250, while it is preferred to use those which have molecular weights no greater than about 150, including any substituent groups therein.

While the condensation products formed from epichlorohydrin, in accordance with the invention, are preferred, the general class of monohaloepoxyalkanes has been found to be particularly suitable for use in the invention, and especially when the amine condensation products thereof are acylated with fatty acids having at least twelve carbon atoms per molecule. Preferably the haloepoxyalkanes should have no more than ten carbon atoms in the molecule, and typically suitable representative species of these include:

Epichlorohydrin (1,2-epoxy-3-chloropropane)
    2,3-epoxy-4-chlorobutane
    1,2-epoxy-3-isopropyl-3-iodopropane
    1,2-epoxy-4-chlorobutane
    1,2-epoxy-5-chloropentane
    1,2-epoxy-3-methyl-3-chloropropane
    1,2-epoxy-3,3-dimethyl-3-chloropropane
    1,2-epoxy-2-methyl-3-bromopropane
    2,3-epoxy-4-methyl-1-chlorohexane
    1,2-epoxy-4-methyl-5-bromopentane Another class of halohydrins which are particularly suitable for the preparation of the agents of this invention are the monohalodihydroxyalkanes, representative suitable species of which are:

2-chloro-1,3-dihydroxypropane
    1-chloro-2,4-dihydroxybutane
    1-chloro-2,3-dihydroxybutane
    3-chloro-1,6-dihydroxyhexane
    1-chloro-2,4-dihydroxy-3-methylbutane
    2-chloro-1,6-dihydroxy-3,4-dimethylhexane
    1-iodo-2,3-dihydroxypropane
    1-bromo-2,3-dihydroxypropane
    2-bromo-1,3-dihydroxypropane It is generally preferred to prepare the condensation products from these monohalodihydroxy compounds in the presence of a dehydrating catalyst such as a strong alkali hydroxide.

Amine-halohydrin condensation products of higher molecular weight may be obtained by condensation of the amino compound (preferably ammonia) with dihalohydrins, a preferred compound being 1,3-dichlor-2-hydroxypropane. Suitable specific dihalohydrins include:

1,2-dichloro-3-hydroxypropane
    1,6-dichloro-2,5-dihydroxyhexane
    1,3-dibromo-2-hydroxypropane
    1,4-diiodo-2,5-dihydroxypentane
    1,4-dichloro-3-methyl-4-hydroxybutane
    1,3-dichloro-3,6-diethyl-5-hydroxyhexane Also, the dihalohydrins are particularly useful compounds for the preparation of resinous materials to be used for the purpose of the invention, by the reaction of said dihalohydrins with alkylene polyamines, preferably tetraethylenepentamine. Other representative suitable compounds are:

1,3-diaminopropane
    1,4-diamino-n-butane
    1,3-diamino-n-butane
    1,5-diamino-n-pentane
    1,6-diamino-n-hexane
    1,10-diamino-n-decane
    1,6-diamino-3-methyl-n-hexane
    3,3'-diamino dipropyl ether The polymeric portion of the product of the condensation of ammonia and epichlorohydrin appears to be a mixture of secondary and tertiary amino compounds having for the most part units of the following configuration, among others:

$$(-\overset{|}{N}-CH_2-CHOH-CH_2-)$$

Thus, the dimer is $$H-(NH-CH_2-CHOH-CH_2)_2-NH_2$$

i e., $$NH_2-CH_2-CHOH-CH_2-NH-CH_2-CHOH-CH_2-NH_2$$

containing both primary and secondary amino groups, while the trimers are probably linear, including cyclic, and cross-linked polymers, the open-chain linear trimer molecules containing only primary and secondary amino groups, the closed ring linear trimer molecules containing only secondary amino groups, and the cross-linked trimers containing only primary and tertiary amino nitrogens, thus:

$$H-(NH-CH_2-CHOH-CH_2)_3-NH_2-$$
                                    open-chain linear trimer $$(-NH-CH_2-CHOH-CH_2-)_3-$$
                                    closed ring linear trimer $$(NH_2-CH_2-CHOH-CH_2-)_3-N-\text{cross-linked trimer}$$

The polymeric product also contains a smaller proportion of corresponding molecules having units of the isomeric configuration:

$$(-\overset{|}{N}-CH_2-CH(CH_2OH)-)$$

wherein the alcoholic hydroxyl group is a primary alcohol instead of a secondary alcohol and one of the amino nitrogens is attached to a secondary carbon atom instead of to a primary carbon atom.

Additionally, it is considered that at least a significant proportion of the polymeric product is made up of oxyether molecules corresponding to those obtainable from condensation of the monomer through the alcoholic hydroxyl group, with or without condensation through amino groups, thus forming polyamino oxy compounds in which a portion or all of the oxy oxygen is present as etheroxygen, i. e., as alkoxy-oxygen. While it is considered that this general description of the product is correct, the exact configuration of the polymeric constituent molecules of the mixture have not been definitely determined. The different products before amide formation vary from a thick liquid to a hard resin-like substance. In general, it is desirable to utilize products which, at least prior to application to the hydrophilic inorganic solid, have molecular weights not greater than about 1000. As the result of heat treatment applied after application of the improving agent to the inorganic solid, separately or in contact with the oleophilic base material, the improving agent may be further polymerized to give products with much higher molecular weights.

The ammonia-epichlorohydrin condensation product, either before or after separation therefrom of the sodium chloride, is mixed with a higher fatty acid, or mixtures thereof, such as by mixing with tallow fatty acid amides or with acids derived from animal or vegetable oils or by the partial oxidation of hydrocarbon mixtures such as various petroleum fractions, and the mixture is heated at a temperature from about 150° C. to about 225° C. for a period of from about 15 minutes to about two hours, or longer if desired, whereby the ammonia-epichlorohydrin product is converted to an amide.

For use in the present invention, sufficient acid may be employed to react in the formation of amides from all of the primary or secondary amino groups present or to form salts with the tertiary amino groups, but it is preferred to form amides of the oleophilic acid with between about ⅓ and ⅔ of the amino nitrogen groups present in the condensation product. It will be understood, however, that in the case of condensation products formed from amines and halohydrins selected to give products containing a substantial proportion of oleophilic groups, which products will be substantially oil-soluble, it will not be necessary to acylate or amidate the condensation product in order to provide the necessary oleophilic characteristic required for utility in the invention. Following the amide formation, which occurs during the indicated heating period with the acid, the hot fluid condensation amide may be decanted from any inorganic salt present. If a more refined product is desired a solvent may be added in order to thin the mixture following which salt may be removed by decantation, filtration or centrifugation. The amides are usually waxy, yellowish, solids with softening points generally between 160° F. and 250° F. The tallow fatty acide amide appears to be a soap-like material which is somewhat sticky at room temperature but which melts at 200° F.

Various organic acidic materials may be used for the formation of the amides, the fatty and naphthenic acids being preferred. Representative suitable fatty acids are: lauric, oleic, linoleic, palmitic, stearic, carnaubic, and the like. Various naphthentic acids recoverable from petroleum fractions may be used, as well as resin acids such as abietic, pimaric, and the like, as well as other cyclic acids such as salicylic acid and alkyl salicylic acids. Acid mixtures such as may be obtained from coconut fat, wool fat, castor oil, and the like are also well adapted for use in the invention. Dibasic acids, particularly alkene- and alkane-1,2-dicarboxylic acids, such as octadecenyl and octadecyl succinic acids are also particularly suitable.

The subject polyamino oxy-compounds are present as absorbed films on the onium clay or dispersed throughout the oil phase which is gelled with an onium clay. As far as can be determined the above class of compounds is not present as an onium radical on the clay but instead is present as a separate divisible entity.

The onium clays utilized in the present compositions are prepared as intimated hereinbefore by ion exchange of an onium compound with the replaceable metallic ions of high base exchange clays. The class of clays useful as starting materials for making the modified onium clays are those exhibiting substantial base exchange properties and particularly those exhibiting comparatively high base exchange properties and containing cations capable of more or less easy replacement. The class particularly contemplated by the specification and claims include the montmorillonites, that is, sodium, potassium, lithium, and other bentonites, particularly of the Wyoming type; magnesium bentonite (sometimes called Hectorite) and saponite; also nontronite and attapulgite, particularly that of the Georgia-Florida type. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides. Bentonites which are particularly useful are the swelling bentonites of the Wyoming type and the swelling magnesium bentonites of the hectorite type.

The base-exchange capacities of the various clays enumerated run from about 25 to about 100, based upon milliequivalents of exchangeable base per 100 grams of clay. The montmorillonites have comparatively high base-exchange capacities, viz., 60-100. Attapulgite has substantial base-exchange capacity, viz., 25-35. Generally, the clays of higher base-exchange capacities are particularly useful where high exchange of an organic base for the cation of the clay is desired.

More specifically, a clay of the character described and exhibiting substantial base-exchange capacity, is reacted with an organic compound, more particularly one hereinafter generally defined and referred to as an "onium" compound, by the substitution for the clay cation of the cation of the organic compound, which cation is of a class hereinafter referred to as an "onium" base. This invention is not, however, restricted to the use of a reaction product of a base-salt with clay-salt, but includes the reaction product of a free base with an acid-clay.

An "onium" compound has been defined in Hackh's Chemical Dictionary, second edition, as "A group of organic compounds of the type $RXH_y$ which are isologs of ammonium and contain the element X in its highest positive valency, viz:

"Where X is pentavalent as in ammonium, phosphonium, arsonium and stibonium; where X is tetravalent as in oxonium, sulfonium, selenonium and stannonium compounds; and where X is trivalent, as in iodonium compounds; and that they may be considered addition compounds of oxonium, carbonium, stibonium, c. f., -inium, -ylium."

A number of the compounds capable of reacting with clays, particularly bentonite, will be described; it is to be understood, however, that various other compounds reactable with clays of the character described, may be employed. These compounds may include salts of aliphatic, cyclic, aromatic and heterocyclic amines, primary, secondary, and tertiary amines and polyamines, also quaternary ammonium compounds, as well as other monobasic or polybasic onium compounds, such as triphenylalkyl phosphonium or stibonium-halides, or dialkyl-, or diaryl-sulphonium and selenonium halides, and pyrones, such as 2,5-dimethyl gamma pyrone hydrochloride.

The ratio of the onium compound, such as, for example, an amine compound, to bentonite, may be varied within certain limits in converting the bentonite to the organophilic condition. In general, it is satisfactory to react the amine salt with the bentonite in the ratio of 100 milliequivalents of amine salt to 100 grams of bentonite, which is approximately the base-exchange capacity of the standard highly swelling sodium bentonites. In accordance with this invention, it is not necessary that the inorganic cation of the clay be completely replaced by the onium base; some of the objects and useful results of this invention may be obtained by partial replacement. Typical values of swelling on the above basis are listed below for a series of dodecylammonium-bentonites, in which the ratio of amine to bentonite was varied over wide limits:

| Amine/bentonite | 50 me./100 g. | 75 me./100 g. | 100 me./100 g. | 125 me./100 g. | 150 me./100 g. | 200 me./100 g. | 300 me./100 g. |
|---|---|---|---|---|---|---|---|
| Swelling in nitrobenzene; ml | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compound such as an amine compound, which when converted to the onium base form and reacted by base-exchange with the clay, is attached to certain points on the surface of the mineral, or to substitute the proper aliphatic chain in a polyammonium base. It has been found that a base with a molecular area of about 70 square angstrom units for example, a primary amine with a chain of 10 carbon atoms, e. g., decyl amines will substantially fulfill the requirements of covering the clay surface. Other types of amines, however, may be used also, e. g., polyamines such as triethylenetetramine, aromatic amines such as naphthylamine, cyclic amines such as cyclohexylamine, heterocyclic amines such as pyridine, secondary amines such as diamylamine, tertiary amines such as lauryl dimethyl amine and quaternary ammonium compounds such as tetraethanolammonium hydroxide. An excess of organic matter as occasioned by use of an amine of area greater than 70 square Angstroms, as, for example, octadecadienyl amine, is not detrimental to the gelling properties of the amine-bentonite composition. Good results, for instance, have been obtained with primary amines having hydrocarbon chains of twelve or more carbon atoms.

The type of clay mineral to be used may vary with the intended use. For optimum gelling properties, it is best to use a bentonite which exhibits good gelling properties in water. However, some non-swelling clays, when converted to the onium salt form, will swell in organic liquids and give rise to thixotropic colloidal dispersion.

The oleaginous fluid forming the major constituent of the present greases may be a mineral lubricating oil or a synthetic lubricant such as those which are well known in the art. These include esters of phosphorus acids, esters of silicic acid, esters of dicarbocylic acids, polyoxy alkylene fluids, fluoro carbons, silicones, and like materials. Specifically, suitable synthetic materials include trihexylphosphate, tricresyl phosphate, bis(2-ethylhexyl sebacate), bis(3,5,5-trimethylhexyl)-2,4,4-trimethyl pentene phosphonate; polymers of trimethylene glycol, copolymers of ethylene oxide and propylene oxide; polymers of dimethyl dichloropentane; and their analogs and homologs.

In accordance with this invention it has been found that the onium clay greases which are substantially lacking in lubricating properties, in the presence of contaminating water, are improved to a surprising extent by the addition thereto of between about 0.5% and about 20%, based on the onium clay, of the subject polyaminooxy compounds so as to provide a composition capable of lubricating moving bearings even in the presence of water. As stated hereinbefore, however, certain shortcomings in the grease are still observable when operation in the possible presence of water is contemplated, particularly with respect to corrosion. One further aspect of the present invention, therefore, comprises the addition of an inorganic nitrite to the essential compositions of this invention in such amounts as to materially promote the reduction in both dynamic and static types of corrosion. Similar results are obtained by the addition of an alkaline-acting compound of an alkaline earth metal, but the most surprising result in this respect is the improvement in both lubricating characteristics and in corrosion which is obtained by the combined use of both nitrite and alkaline compounds in conjunction with the polyaminooxy compounds as modifying agents for onium clay greases.

The nitrites useful in the compositions of the present invention include especially ammonium nitrite, alkali metal nitrites such as sodium nitrite, potassium nitrite, and lithium nitrite; alkaline earth metal nitrites such as barium, calcium and magnesium nitrites and heavy metal nitrites such as copper nitrite, iron nitrite and lead nitrite, as well as amphoteric metal nitrites, including aluminum nitrite and zinc nitrite. It is preferred that the nitrites be present in an amount between about 1% and 20%, based on the weight of the onium clay.

The alkaline earth metal compounds useful as promoters for the improvement of lubricating and corrosion characteristics are especially the oxides and hydroxides of alkaline earth metals, including calcium hydroxides, barium hydroxides, magnesium hydroxides, and the corresponding oxides thereof. It is likewise a preferred practice to include from about 1% to about 20% of these alkaline additives, based on the weight of the onium clay.

This case is a continuation-in-part of patent application Ser. No. 133,962, filed December 19, 1949, by Walter H. Peterson, now U. S. Patent No. 2,623,852.

The examples which follow illustrate the present invention.

*Example I*

An onium clay was prepared by dispersing a Wyoming bentonite in water and adding dimethyl dioctadecyl bromide thereto and subsequently washing sodium bromide out by decantation washing. The product was filtered and dried to produce an anhydrous onium clay comprising about 75–100 milliequivalents of onium radicals per 100 grams of the original clay product. This onium clay was dispersed in a mineral lubricating oil to produce a grease composition containing about 10% of the onium clay. The grease was used for the lubricating of a motor bearing at ambient temperature (about 60–80° C.) in the presence of approximately 10% water. Failure of lubrication was rapid, and the bearing froze within a few minutes after the motor was started. The addition of a partial amide of epichlorohydrin and ammonia condensation product in an amount of 1% by weight of the grease permitted the bearing to run even in the presence of water, although the bearing operated at a somewhat elevated temperature. The addition of calcium hydroxide to the latter grease in an amount of 0.5%, based on the weight of grease improved the corrosion characteristics, especially with respect to dynamic corrosion, although the temperature of operation was still somewhat elevated. The further addition of sodium nitrite to the last described grease showed the surprising result of greatly enhanced lubricating characteristics and at the same time, substantially complete protection against both dynamic and static corrosion. Sodium nitrite was present in an amount of 0.5% based on the weight of the grease. The partial amide was formed by adding epichlorohydrin in small incremental portions to concentrated aqueous ammonia at a temperature of 30–50° C. over a period of 1–3 hours. An excess of ammonia was present in a ratio of about 6 to 1 moles of ammonia for each mol of epichlorhydrin. Ammonium chloride was removed from the product which was then treated with tallow fatty acids by heating for a period of about one hour at a temperature of 175–225° C. in order to produce a partial amide wherein approximately ⅓–½ of the amino nitrogen atoms are converted to the amide form.

I claim as my invention:

1. A grease composition comprising a major proportion of a mineral lubricating oil having colloidally dispersed therein a gelling proportion of an organophilic bentonite originally exhibiting a base-exchange capacity of at least 60, in which the exchangeable inorganic cation has been exchanged for an ammonium base having at least one aliphatic radical containing between 14 and 18 carbon atoms in a chain, from about 0.5% to about 20% by weight, based on the organophilic bentonite of an oleophilic polyamino oxy compound containing at least three nitrogen atoms and oxy groups together spaced apart in the molecule by not more than 10 carbon atoms, from about 1% to about 20% by weight, based on the organophilic bentonite, of an inorganic nitrite and from about 1% to about 20% by weight based on the organophilic bentonite, of an alkaline earth metal hydroxide.

2. A grease composition comprising a major proportion of a mineral lubricating oil having colloidally dispersed therein a gelling proportion of an organophilic bentonite originally exhibiting a base-exchange capacity of at least 60, in which the exchangeable inorganic cation has been exchanged for an ammonium base having at least one aliphatic radical containing at least 14 carbon atoms in a chain, from about 0.5% to about 20% by weight, based on the organophilic bentonite of an oleophilic higher fatty acid partial amide of a condensation product of epichlorohydrin and ammonia, from about 1% to about 20% by weight, based on the organophilic bentonite, of an alkali metal nitrite and from about 1% to about 20% by weight, based on the organophilic bentonite, of an alkaline earth metal hydroxide.

3. A grease composition comprising a major proportion of a mineral lubricating oil having colloidally dispersed therein a gelling proportion of an organophilic bentonite originally exhibiting a base-exchange capacity of at least 60, in which the exchangeable inorganic cation has been exchanged for an ammonium base having at least one aliphatic radical containing at least 14 carbon atoms in a chain from about 0.5% to about 20%, based on the weight of the organophilic bentonite of an oleophilic partial higher fatty acid amide of a condensation product of epichlorohydrin and ammonia, from about 1% to about 20%, based on the weight of the organophilic bentonite, of sodium nitrite, and from about 1% to about 20% by weight based on the organophilic bentonite, of calcium hydroxide.

References Cited in the file of this patent
UNITED STATES PATENTS

| | | |
|---|---|---|
| 2,531,440 | Jordan | Nov. 28, 1950 |
| 2,573,650 | Peterson | Oct. 30, 1951 |
| 2,623,852 | Peterson | Dec. 30, 1952 |
| 2,623,853 | Stross | Dec. 30, 1952 |
| 2,625,508 | Stross | Jan. 13, 1953 |
| 2,626,899 | Abrams et al. | Jan. 27, 1953 |
| 2,648,633 | Peterson et al. | Aug. 11, 1953 |
| 2,652,361 | Woods et al. | Sept. 15, 1953 |